United States Patent
Thankappan

(10) Patent No.: US 11,231,876 B2
(45) Date of Patent: Jan. 25, 2022

(54) INITIAL DATA PLACEMENT IN HYBRID OBJECT STORAGE SYSTEM

(71) Applicant: Western Digital Technologies, Inc., San Jose, CA (US)

(72) Inventor: Sudhish Panamthanath Thankappan, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 114 days.

(21) Appl. No.: 16/581,127

(22) Filed: Sep. 24, 2019

(65) Prior Publication Data

US 2021/0089231 A1 Mar. 25, 2021

(51) Int. Cl.
G06F 3/06 (2006.01)

(52) U.S. Cl.
CPC .......... *G06F 3/0659* (2013.01); *G06F 3/0604* (2013.01); *G06F 3/064* (2013.01); *G06F 3/068* (2013.01)

(58) Field of Classification Search
CPC ...... G06F 3/0659; G06F 3/0604; G06F 3/064; G06F 3/068
See application file for complete search history.

(56) References Cited

U.S. PATENT DOCUMENTS

| | | | | |
|---|---|---|---|---|
| 8,316,213 B1 * | 11/2012 | Sorenson, III | ...... | H04L 67/1097 711/216 |
| 10,097,634 B1 * | 10/2018 | Gorantla | ............. | H04L 67/1095 |
| 2007/0156842 A1 * | 7/2007 | Vermeulen | ........ | H04L 29/06047 709/217 |
| 2007/0168336 A1 * | 7/2007 | Ransil | ................... | G06F 16/958 |
| 2010/0333116 A1 * | 12/2010 | Prahlad | .................. | G06F 16/41 719/328 |
| 2012/0284460 A1 | 11/2012 | Guda | | |
| 2013/0060999 A1 | 3/2013 | Chiu et al. | | |

(Continued)

FOREIGN PATENT DOCUMENTS

| | | |
|---|---|---|
| EP | 2525293 A1 | 11/2012 |
| WO | 2008069811 A1 | 6/2008 |
| WO | 2019092499 A1 | 5/2019 |

OTHER PUBLICATIONS

International Search Report and Written Opinion of Application No. PCT/US2020/024785, dated Jun. 10, 2020 (10 pages).

(Continued)

*Primary Examiner* — William E. Baughman
(74) *Attorney, Agent, or Firm* — Patent Law Works LLP

(57) ABSTRACT

An example system may provide for plurality of object block stores and a store management system. The store management system is configured to access a first bucket including a first storage class bucket tag identified by a first key-value pair corresponding to a first one of the plurality of object block stores with a first storage class. The store management system is further configured to write a first data object to the first one of the plurality of object block stores with a first storage class. The first one of the plurality of object block stores is represented by the first bucket. The first one of the plurality of object block stores is configured to store the first data object according to the first storage class specified by the first storage class bucket tag.

20 Claims, 6 Drawing Sheets

(56) References Cited

U.S. PATENT DOCUMENTS

| | | | |
|---|---|---|---|
| 2016/0196324 A1* | 7/2016 | Haviv | G06F 3/0649 |
| | | | 707/626 |
| 2017/0093913 A1 | 3/2017 | Summers et al. | |
| 2017/0337154 A1* | 11/2017 | Barber | G06F 9/5016 |
| 2018/0121476 A1 | 5/2018 | Bakke et al. | |
| 2018/0322017 A1* | 11/2018 | Maccanti | G06F 11/1466 |
| 2018/0373745 A1* | 12/2018 | Bhagwat | G06F 16/955 |
| 2019/0146718 A1* | 5/2019 | Ben Dayan | G06F 3/064 |
| | | | 711/154 |
| 2020/0326876 A1* | 10/2020 | Tian | G06F 9/44 |

OTHER PUBLICATIONS

Amazon S3 Storage Classes, pp. 1-5, https://aws.amazon.com/s3/storage-classes/.

Amazon S3 Storage Classes, pp. 1-4, https://docs.aws.amazon.com/AmazonS3/latest/dev/storage-class-intro.html.

Set Default Bucket Storage Class, pp. 1-2, https://cloud.google.com/storage/docs/xml-api/put-bucket-storage-class.

BM Cloud Docs / Cloud Object Storage, Aug. 23, 2019, pp. 1-2, https://cloud.ibm.com/docs/services/cloud-object-storage/cli?topic=cloud-object-storage-aws-cli#use-the-aws-cli.

PUT Bucket tagging, Mar. 1, 2006, pp. 1-3, https://docs.aws.amazon.com/AmazonS3/latest/API/RESTBucketPUTtagging.html.

Object Tagging, pp. 1-5, https://docs.aws.amazon.com/AmazonS3/latest/dev/object-tagging.html.

* cited by examiner

INITIAL DATA PLACEMENT IN HYBRID OBJECT STORAGE SYSTEM

TECHNICAL FIELD

The present disclosure generally relates to data storage, and in a more particular non-limiting example, to storing and initial selective placement of objects in storage having specific capabilities.

BACKGROUND

Often, distributed storage systems are used to store large amounts (e.g., terabytes, petabytes, exabytes, etc.) of data, such as objects or files in a distributed and fault-tolerant manner with a predetermined level of redundancy. Users of storage systems are sensitive to the total cost of ownership (TCO) relative to storing their data. Further, not all data needs to be stored in data storage that has the same capabilities. For example, some data may need to be accessed at a higher speed to meet workload requirements, while other data may be rarely accessed.

Accordingly, hybrid object storage systems may include both less expensive storage implemented using, for example, hard disk drives (HDD), and more expensive storage implemented using, for example, solid-state drives (SSD) which accommodate high-speed data access. Such hybrid systems may, over time, migrate data between the various storage implementations, however, it would be desirable to initially place the data in storage that exhibits a preferred capability.

SUMMARY

The present disclosure describes, among other things, various aspects for storing data, and in a more particular non-limiting example, aspects for the initial selective placement of objects in storage having specific capabilities. In general, one innovative aspect of the subject matter described in this disclosure may be embodied in a system that has a plurality of object block stores and a store management system. The store management system is configured to access a first bucket including a first storage class bucket tag identified by a first key-value pair corresponding to a first one of the plurality of object block stores with a first storage class. The store management system is further configured to write a first data object to the first one of the plurality of object block stores with the first storage class, where the first one of the plurality of object block stores with the first storage class is represented by the first bucket. The first one of the plurality of object block stores with the first storage class is configured to store the first data object according to the first storage class specified by the first storage class bucket tag. Implementations may include one or more of the following features. In one implementation, the store management system may be further configured to receive at the store management system a first key-value pair specifying a requirement of the first data object, and create the first bucket identified by the first storage class bucket tag, where the first bucket corresponds to the first one of the plurality of object block stores with the first class according to the requirement of the first data object. Another implementation may include the store management system being further configured to receive the first data object and a first store capability object tag specifying the first bucket and the first store capability. The store management system may be further configured to define a second bucket including a second storage class bucket tag identified by a second key-value pair corresponding to a second one of the plurality of object block stores with a second store capability, and write a second data object to the second one of the plurality of object block stores. The second one of the plurality of object block stores may be represented by the second bucket, and where the second one of the plurality of object block stores is configured to store the second data object according to the second capability specified by the second storage class bucket tag. Yet another implementation may include the system where the second data object further includes a second store capability object tag identified by the second key-value pair corresponding to the second one of a plurality of object block stores with differing storage classes. A further implementation may include a system where the plurality of object block stores with differing storage classes of the plurality of object block stores includes one or more of: an access speed of the plurality object block stores, storage capacity of the plurality of object block stores, latency of the plurality of object block stores, and storage type of the plurality of object block stores. Further, the system may be configured where the plurality of object block stores with differing storage classes of the plurality of object block stores includes capabilities of a solid-state drive (SSD) and a hard disk drive (HDD). Another general aspect includes a computer-implemented method that includes: writing a first data object to a first one of a plurality of object block stores with a first storage class, the first one of the plurality of object block stores represented by a first bucket defined in a store management system, the first bucket including a first storage class bucket tag identified by a first key-value pair corresponding to the first one of the plurality of object block stores with the first storage class, and storing the first data object in the first one of the plurality of object block stores with the first storage class according to the first storage class specified by the first storage class bucket tag. Implementations may include one or more of the following features. The method may further comprise determining the first storage class bucket tag according to a first requirement of the first data object, creating the first bucket in the store management system including specifying the first storage class bucket tag. Another implementation may include the method in which the first data object further includes a first store capability object tag identified by the first key-value pair corresponding to the first one of the plurality of object block stores with differing storage classes. Another implementation may include the method further including writing a second data object to a second one of the plurality of object block stores, the second one of the plurality of object block stores represented by a second bucket, and storing the second data object in the second one of the plurality of object block stores according to a second storage class specified by a second storage class bucket tag. A further implementation may include the method where the second data object further includes a second store capability object tag identified by a second key-value pair corresponding to a second one of the plurality of object block stores with differing storage classes. Further, the plurality of differing storage classes of the plurality of object block stores includes classes of one or more of: an access speed of the plurality object block stores, storage capacity of the plurality of object block stores, latency of the plurality of object block stores, and storage type of the plurality of object block stores. In a further implementation, the plurality of differing storage classes of the plurality of object block stores includes capabilities of a solid-state drive (SSD) and a hard disk drive (HDD).

Another general aspect includes a system comprising means for writing a first data object to a first one of a plurality of object block stores, the first one of the plurality of object block stores represented by a first bucket defined in a store management system, the first bucket including a first storage class bucket tag identified by a first key-value pair corresponding to a first one of the plurality of object block stores with a first storage class, and means for storing the first data object in the first one of the plurality of object block stores according to the first storage class specified by the first storage class bucket tag. An implementation may include one or more of the following features. In one implementation, the system includes means for determining the first storage class bucket tag according to a first requirement of the first data object, and a means for creating the first bucket in the store management system including specifying the first storage class bucket tag. Another implementation includes the system where the first data object further includes a first store capability object tag identified by the first key-value pair corresponding to a first one of a plurality of object block stores with differing storage classes. Another implementation of the system includes a means for writing a second data object to a second one of the plurality of object block stores, the second one of the plurality of object block stores represented by a second bucket, and a means for storing the second data object in the second one of the plurality of object block stores according to a second storage class specified by a second storage class bucket tag. In another implementation, the second data object further includes a second store capability object tag identified by a second key-value pair corresponding to a second one of the plurality of object block stores with differing storage classes. In a further implementation, the plurality of object block stores with differing storage classes of the plurality of object block stores includes one or more of: an access speed of the plurality object block stores, storage capacity of the plurality of object block stores, latency of the plurality of object block stores, and storage type of the plurality of object block stores.

The various embodiments advantageously apply the teachings of hybrid object block stores which can provide advantages, including a reduced total cost of ownership (TCO) with options for high-speed data access (e.g., using solid-state drives (SSDs) or lower cost of ownership (e.g., using hard disk drives (HDDs). Accordingly, an orchestrated initial placement of objects provides the aforementioned benefits.

The various embodiments include operations to overcome or at least reduce the issues in the previous storage networks and/or systems discussed above and, accordingly, are more reliable and/or efficient than other storage systems. That is, the various embodiments disclosed herein include hardware and/or software with functionality to improve the cost-effective initial placement of objects (e.g., data) in an appropriate storage repository (e.g., object block stores). Accordingly, the embodiments disclosed herein provide various improvements to storage networks and/or storage systems.

It should be understood that the language used in the present disclosure has been principally selected for readability and instructional purposes, and not to limit the scope of the subject matter disclosed herein.

DETAILED DESCRIPTION

Object storage systems provide object block stores for storing data objects. Data objects may be abstractly contained in 'buckets' and each bucket may be abstractly associated with a specific object storage system or with specific data object block stores. Specific object storage systems and data object block stores may exhibit a number of store capabilities or attributes, including inherent capabilities such as access speed of the object block stores, storage capacity of the object block stores, latency of the object block stores, and storage type of the object block stores. In some systems, a user of a client device may request data objects to be uploaded to data stores (e.g., backend disks) that exhibit specific requested store capabilities.

In the various embodiments, storage capability tagging is employed. In one embodiment, storage capability bucket tagging provides an option for objects to be stored in a selected class of storage. In one scenario, a user may need to store data which requires fast and frequent access. In such an embodiment, separate block stores may be created on backend storage nodes using SSD and HDD storage. The block stores may be tagged with the backend media type or "storage capability." During bucket creation, a user provides an additional field, such as a "store capability" and "store class," which may take the form of a key-value-pair. A bucket may then be created and tagged with the user-provided "store capability." Thereafter, all objects written to the tagged bucket will be stored on the respective media type.

In another embodiment, the objects to be stored may be tagged with a store capability object tag. In this embodiment, instead of bucket tagging, a user will use object tagging, which may include a key-value pair of a "store capability" and a "store class" to the object during a PUT or write operation. The objects will then be stored on a block-store match into a bucket with the corresponding store capability.

Various benefits and cost savings may result from the various embodiments including allowing a user to utilize a hybrid storage system that includes both SSD and HDD stores. In such a system, object transaction performance may be obtained without requiring mixed workloads. Further, a user or customer may utilize a hybrid object storage system and obtain granular control on data placement based on the performance requirements of the separate objects.

Figure 1:
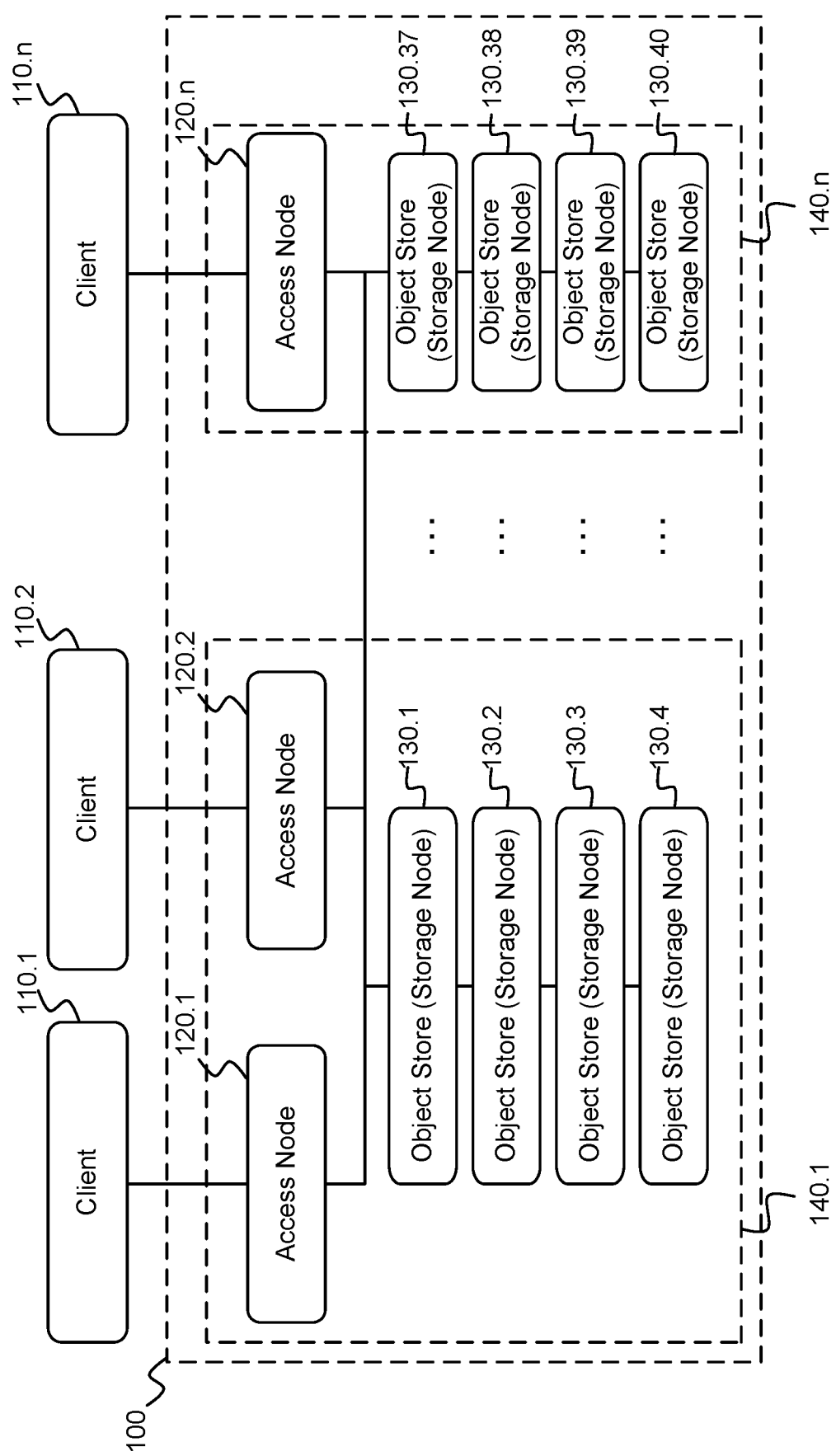
FIG. 1 illustrates an embodiment of an example distributed storage system.

FIG. 1 illustrates an embodiment of an example distributed storage system 100. In some embodiments, the distributed storage system 100 may be implemented as a distributed object storage system which is coupled to one or more clients 110.1-110.n for storing and accessing data objects through one or more access nodes 120.1-120.n. The connection between the distributed storage system 100 and clients 110 could, for example, be implemented as a suitable data communication network. Clients 110 may host or interface with one or more applications that use data stored in the distributed storage system 100. Such an application could, for example, be a dedicated software application running on a client computing device, such as a personal computer, a laptop, a wireless telephone, a personal digital assistant, or any other type of communication device that is able to interface directly with the distributed storage system 100.

However, according to alternative embodiments, the applications could, for example, comprise a suitable file system which enables a general-purpose software application to interface with the distributed storage system 100, an application programming interface (API) library for the distributed storage system 100, etc. In some embodiments, access nodes 120 may include a file interface system for receiving file data requests from clients 110 according to a file system protocol and access data in storage nodes or object block stores 130.1-130.40 using a different storage protocol, such as an object storage protocol.

As further shown in FIG. 1, the distributed storage system 100 comprises a plurality of access nodes 120 and a plurality of object block stores (e.g., storage nodes) 130 which may be coupled in a suitable way for transferring data, for example by means of a conventional data communication network such as a local area network (LAN), a wide area network (WAN), a telephone network, such as the public switched telephone network (PSTN), an intranet, the internet, or any other suitable communication network or combination of communication networks. Access nodes 120, object block stores (e.g., storage nodes) 130 and the computing devices comprising clients 110 may connect to the data communication network by means of suitable wired, wireless, optical, etc. network connections or any suitable combination of such network connections. Although the embodiment of FIG. 1 shows only three access nodes 120 and forty storage nodes or object block stores 130, according to alternative embodiments the distributed storage system 100 could comprise any other suitable number of object block stores 130 and, for example, two, three or more access nodes 120 coupled to these object block stores 130.

These access nodes 120 and object block stores 130 may be built as general-purpose computers. Alternatively, they may be physically adapted for arrangement in large data centers, where they are arranged in modular racks 140.1-140.n comprising standard dimensions. Exemplary access nodes 120 and object block stores 130 may be dimensioned to take up a single unit of such racks 140, which is generally referred to as 1 U. Such an exemplary object block store may use a low-power processor and may be equipped with ten or twelve high capacity serial advanced technology attachment (SATA) disk drives and is connectable to the network over redundant Ethernet network interfaces. An exemplary access node 120 may comprise high-performance servers and provide network access to clients 110 over multiple high bandwidth Ethernet network interfaces. Data can be transferred between clients 110 and such access nodes 120 by means of a variety of network protocols including hypertext transfer protocol (HTTP)/representational state transfer (REST) object interfaces, language-specific interfaces such as Microsoft .Net, Python or C, etc. Additionally, such access nodes may comprise additional high bandwidth Ethernet ports to interface with the object block stores 130. In some embodiments, HTTP/REST protocols complying with the Amazon Simple Storage Service (S3) object storage service may enable data transfer through a REST application protocol interfaces (API). Such access nodes 120 may operate as a highly available cluster of controller nodes with one or more integrated and/or independent interface systems, and provide for example shared access to the object block stores 130, metadata caching, protection of metadata, etc.

As shown in FIG. 1 several object block stores (e.g., storage nodes) 130 can be grouped together, for example, because they are housed in a single rack 140. For example, object block stores 130.1-130.4 and 130.7-130.40 each are respectively grouped into racks 140.1 and 140.n. Access nodes 120 may be located in the same or different racks as the object block stores to which the access nodes connect. A rack may have multiple access nodes, for example, rack 140.1, a single access node as rack 140.n, or no access nodes (not shown) and rely on an access node in another rack or storage nodes or clients with a built-in access node and/or controller node capabilities. These racks are not required to be located at the same location; they are often geographically dispersed across different data centers.

Figure 2:
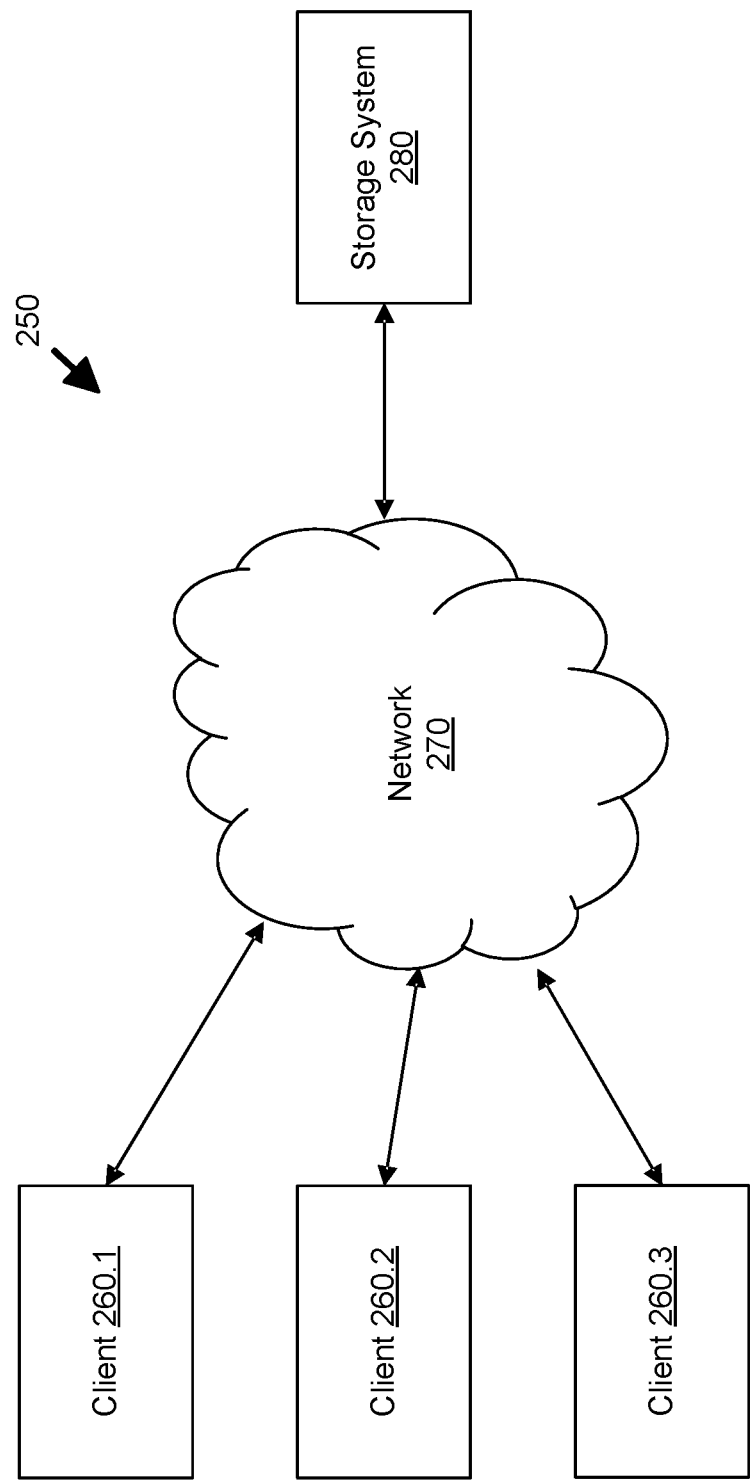
FIG. 2 is a block diagram of an example storage network using a client architecture.

FIG. 2 is a block diagram of an example storage network 250 using a client architecture. In some embodiments, distributed storage system 100 may be embodied in such a storage network 250. As shown, storage network 250 can include multiple client devices 260 capable of being coupled to and in communication with a storage network 250 via a wired and/or wireless network 270 (e.g., public and/or private computer networks in any number and/or configuration (e.g., the Internet, an intranet, a cloud network, etc.)), among other examples that may include one client device 260.1 or two or more client devices 260 (e.g., is not limited to three client devices 260.1-260.3).

A client device 260 can be any computing hardware and/or software (e.g., a thick client, a thin client, or a hybrid thereof) capable of accessing storage system 280 utilizing network 270. Each client device 260, as part of its respective operation, relies on sending input/output (I/O) requests to the storage system 280 to write data, read data, and/or modify data. Specifically, each client device 260 can transmit I/O requests to read, write, store, communicate, propagate, and/or transport instructions, data, computer programs, software, code, routines, etc., to the storage system 280. Client device(s) 260 and storage system 280 may comprise at least a portion of a client-server model. In general, storage system 280 can be accessed by client device(s) 260 and/or communication with storage system 280 can be initiated by client device(s) 260 through a network socket (not shown) utilizing one or more inter-process networking techniques. In some embodiments, client devices 260 may access one or more applications to use or manage a distributed storage system, such as distributed storage system 100 in FIG. 1.

Figure 3:
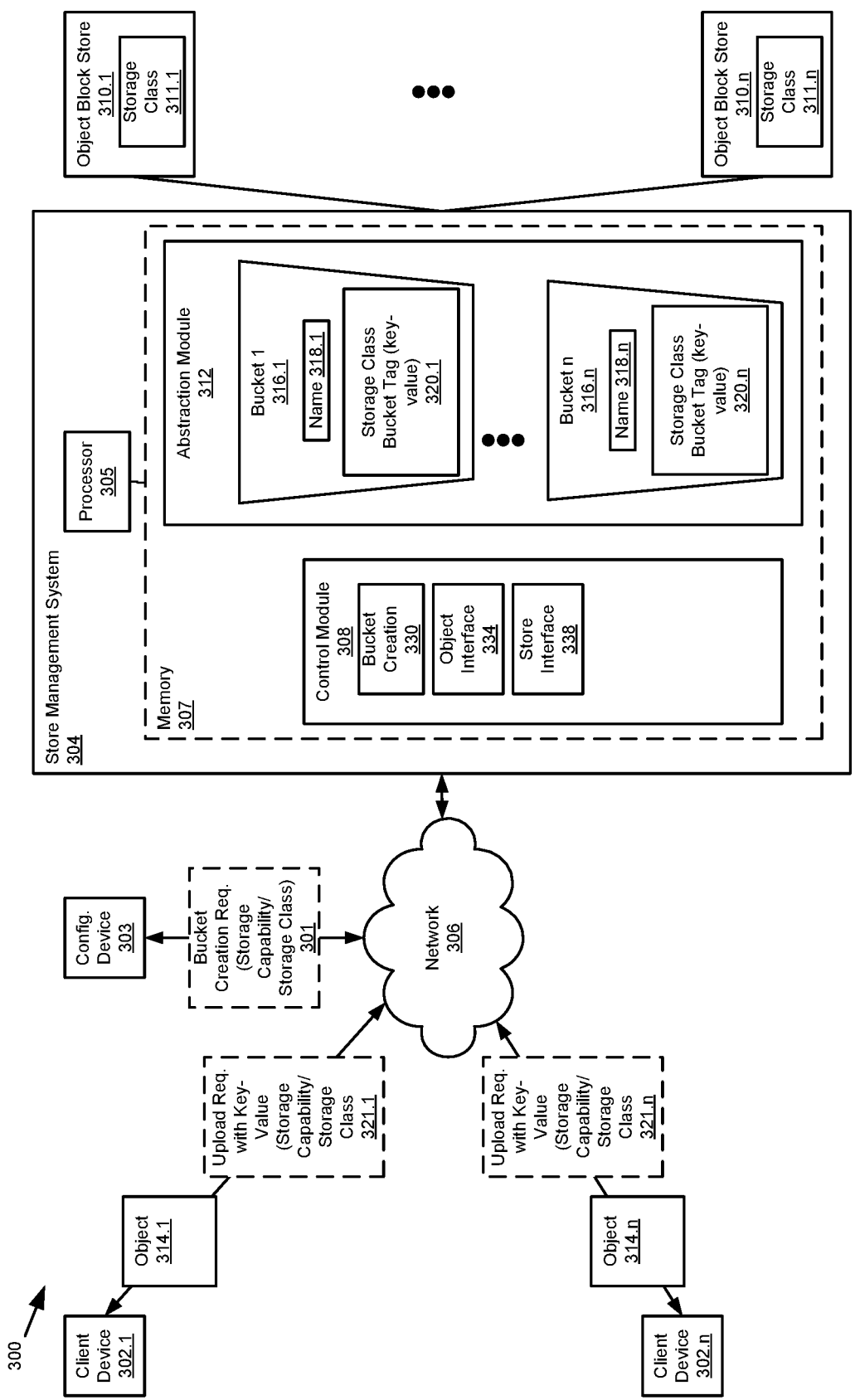
FIG. 3 illustrates a block diagram of an example storage system that includes a store management system for interfacing with a plurality of object block stores.

FIG. 3 illustrates a block diagram of a storage system 300, such as a distributed storage system, that includes a plurality of object block stores 310 and a store management system 304. In a first embodiment, a bucket is tagged with the capabilities of the associated object block stores thereby allowing a client to store objects directly into a bucket exhibiting the desired store capabilities. The bucket may be tagged with a store capability of the backend disk(s), and then all objects that are preferred to be stored according to the selected store capabilities may be written to or PUT in the respective bucket. In such an embodiment, tagging only needs to be performed once at the bucket, instead of individually tagging each of the data objects. According to this embodiment, the end-user need not be aware of how data placement is done or of the storage administration. Essentially, whichever entity creates the bucket, can control the data placement. Implementation of this feature may include modeling the disk properties at a block store level and mapping the store capability by tagging at the bucket level.

The store management system 304 may be configured to define a first bucket 316.1 including a first storage class bucket tag 320.1. The first storage class bucket tag may include a first key-value pair corresponding to object block store differing capabilities identified as storage classes 311 of the object block stores 310 associated with the first bucket 316.1. The store management system 304 may be further configured to write a first data object 314.1 to a first one of the plurality of object block stores 310.1, where the first one of the plurality of object block stores 310.1 is represented by the first bucket 316.1. Also, the first one of the plurality of object block stores 310.1 is configured to store the first data object 314.1 in the first one of the plurality of object block stores 310.1, and operate according to the first one of the plurality of object block store differing capabilities identified as storage class 311.1 specified by the first storage class bucket tag 320.1.

More specifically, the storage system 300 includes one or more client devices 302 configured to communicate with the store management system 304 via a network 306.

The store management system 304 may be a distributed (e.g., cloud-based) system having a scalable storage configuration. The store management system 304 may include a processor 305 and a memory 307. Together, the processor 305 and memory 307 operate to form a control module 308, an abstraction module 312, and interfaces for storing objects in object block stores with specific store capabilities. The store management system 304 may be coupled to a plurality of object block stores 310. Some of the object block stores 310 include differing capabilities, examples of which include differing access speed of the object block stores, storage capacity of the object block stores, latency of the object block stores, and storage type of the object block stores.

In one example, an object block store 310.1 may be configured as a hard disk drive (HDD), which exhibits particular first store capabilities with regard to, for example, access speed, storage capacity, latency, and storage type. In another example, an object block store 310.*n* may be configured as a solid-state disk drive (SSD), which exhibits particular second store capabilities with regard to, for example, access speed, storage capacity, latency, and storage type.

The store management system 304 further includes a storage abstraction module 312 that presents a storage configuration to a client device 302 and overlays the storage configuration on the object block stores 310. The storage abstraction module 312 allows for configurable and scalable use of the object block stores 310. The object block stores 310 may be configured by one or more of client devices 302 or by a configuration device 303. The storage abstraction module 312 is configured to facilitate storage of data objects 314.1-314.*n* received from the client devices 302. The data objects 314 may include unstructured data such as video, images, documents, files, etc. The storage abstraction module 312 may include a plurality of buckets 316.1-316.*n*, with each configured as a container for holding data objects 314 uploaded by a client device 302.

In operation, a client device 302 or a configuration device 303 may create one or more buckets 316.1-316.*n*, using a bucket creation module 330, to organize and control access to the data objects. To create a bucket 316, the client device 302 or another host, such as the configuration device 303, specifies a bucket name 318 and specifies a storage class bucket tag 320 identifying a store capability property or storage class 311 for the bucket. The bucket name 318 is a unique identifier identifying, usually globally, only one bucket 316.

The storage class bucket tag 320 identifies, at the abstraction module 312, the corresponding physical object block stores 310 associated with the specific bucket 316 represented in the abstraction module 312. The abstraction module 312 maps the abstracted bucket 316 to respective object block stores 310 having the capability or storage class 311 that is specified by the key-value pair in the upload request 321. The storage class bucket tag 320 may include various values or capability properties of the corresponding object block store. For example, the storage class bucket tag 320 may be configured as a key-value pair with the key being the store capability and the value being one of, but not limited to, one of access speed, storage capacity, latency, and storage type of the corresponding object block store 310.

While data objects 314 are targeted to be stored in object block store 310, not all data objects 314 serve the same purpose. Some data objects 314 may need to be more readily available for quick or frequent access, while other data objects 314 may be targeted for archival storage in object block stores 310. Accordingly, each data object 314 may have associated therewith one or more attributes, which may identify a store capability demand for the object. The attributes of data object 314 may also include other properties such as an object identifier, size, source/destination identifiers, etc.

As stated, the storage system 300 includes a plurality of object block stores 310, and a store management system 304. The store management system includes an abstraction module 312 configured to define, using a bucket creation module 330, a first bucket 316.1 including a first storage class bucket tag 320.1 identified by a first key-value pair corresponding to a first one of a plurality of object block store differing capabilities.

In the first embodiment, the object interface module receives an upload request 321.1 which includes the bucket name (e.g., identifier) 318.1 specifying the bucket 316 that is designated to receive and store the data objects 314. The object interface module 334 receives a first data object 314.1 and a store interface module 338 writes the first data object 314.1 to a first one of the plurality of object block stores 310.1. The first one of the plurality of object block stores 310.1 is represented by the first bucket 316.1. The first one of the plurality of object block stores 310.1 is configured, using a store interface module 338, to store the first data object 314.1 in the first one of the plurality of object block stores 310.1. The first one of the plurality of object block stores 310.1 operates according to the first one of the plurality of object block store differing capabilities or storage class 311.1 specified by the first storage class bucket tag 320.1.

In another aspect, the store management system 304 is further configured, using the bucket creation module 330, to determine the first storage class bucket tag 320.1 according to a first requirement of the first data object 314.1. In yet another aspect, the bucket creation module 330 creates the first bucket 316.1 in the store management system 304 including specifying the first storage class bucket tag 320.1.

In a further aspect, the store management system 304 is further configured to define a second bucket 316.*n* including a second storage class bucket tag 320.*n* identified by a second key-value pair corresponding to a second one of the plurality of object block store differing capabilities. The store management system 304 if further configured, using a store interface module 338, to write a second data object 314.n to a second one of the plurality of object block stores 310.n. The second one of the plurality of object block stores is represented by the second bucket 316.n and the second one of the plurality of object block stores 310.n is configured to store the second data object 314.n in the second one of the plurality of object block stores 310.n.

Figure 4:
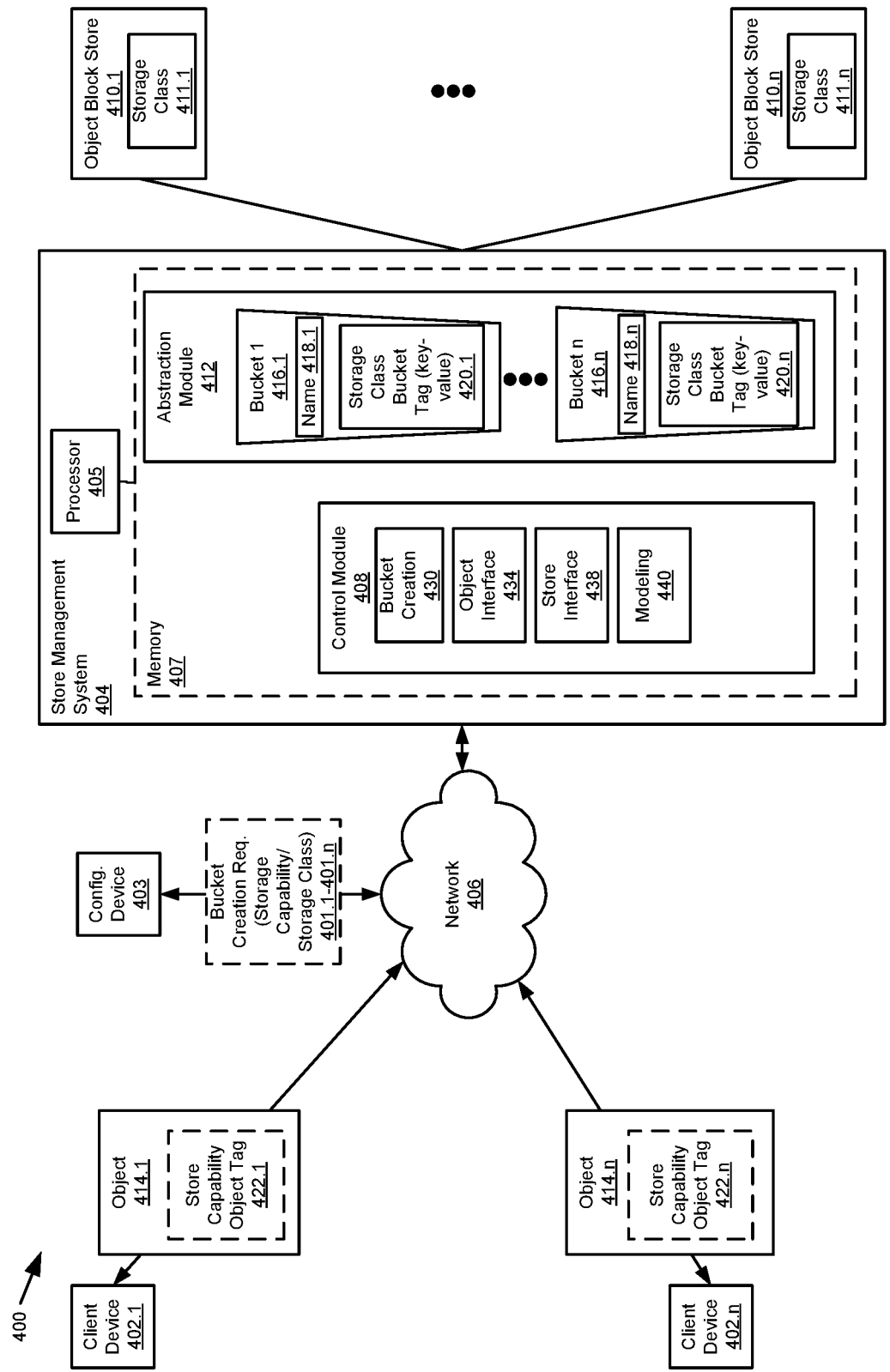
FIG. 4 illustrates a block diagram of an example storage system that includes a store management system for interfacing with a plurality of object block stores.

FIG. 4 illustrates a block diagram of a storage system 400, such as a distributed storage system, that includes a plurality of object block stores 410 and a store management system 404, according to a second embodiment. In the second embodiment, buckets are created with differing capabilities and then the objects written to the system include object tags specifying a store capability demand or expectation for the data object. The data objects may be tagged with an object block store capability tag requesting storage in an object block store that meets the requested capabilities. The object block store capability tag is formed by the first key-value pair corresponding to a first one of a plurality of object block store capabilities (which may differ from other capabilities). A store management system may write or PUT the store capability tagged data object in a bucket that exhibits store capabilities in the associated backend object block store corresponding to those specified or requested in the object block store compatibility tag.

In the second embodiment, the store management system 404 receives the data objects 414 using the object interface module 434. The received data objects 414 are then processed by the abstraction module 412 configured to read the store capability object tag 422 associated with the received data objects 414, and determine a bucket 416 that identifies object block stores 410 that exhibit capabilities or storage classes 411 sufficient to meet the requested capabilities specified in the store capability object tag 422 associated with the data object 414. A store interface module 438 then uploads the received data object 414 to an object block store 410 having the store capabilities identified as a storage class 411 corresponding to the store capability object tag 422 of the data object 414.

In the second embodiment, the store management system 404 may be configured to define buckets including a first bucket 416.1 and a second bucket 416.n. The buckets 416 are created using a modeling module 440 which identifies the available object block stores 410 based on a storage classes 411 of the object block stores 410. The modeling module 440 may have insight and an understanding of the underlying hardware associated with the storage system 400. The underlying composition of the object block store 410 may include hardware components that exhibit differing capabilities with respect to various capabilities, examples of which include differing access speed of the object block stores, storage capacity of the object block stores, latency of the object block stores, and storage type of the object block stores.

The store management system 404 is further configured to write a first data object 414.1 to a first one of the plurality of object block stores 410.1, where the first one of the plurality of object block stores 410.1 represented by the first bucket 416.1. Also, the first one of the plurality of object block stores 410.1 is configured to store the first data object 414.1 in the first one of the plurality of object block stores 410.1, when the object block stores 410.1 associated with the first bucket 416.1 include compatibilities 411.1 that are sufficient to meet the object block store capability tag 422.1 associated with the first object 414.1.

More specifically, the storage system 400 includes one or more client devices 402 configured to communicate with the store management system 404 via a network 406.

Like the first embodiment, the store management system 404 may be a distributed (e.g., cloud-based) system having a scalable storage configuration. The store management system 404 may include a processor 405 and a memory 407. The processor 405 and memory 407 operate to form a control module 408, an abstraction module 412, and interfaces for storing objects in object block stores with specific store capabilities. The store management system 404 may be coupled to a plurality of object block stores 410. Some of the object block stores 410 include differing capabilities, examples of which include differing access speed of the object block stores, storage capacity of the object block stores, latency of the object block stores, and storage type of the object block stores.

In one example, an object block store 410.1 may be configured as a hard disk drive (HDD), which exhibits particular first store capabilities with regard to, for example, access speed, storage capacity, latency, and storage type. In another example, an object block store 410.n may be configured as a solid-state disk drive (SSD), which exhibits particular second store capabilities with regard to, for example, access speed, storage capacity, latency, and storage type.

The store management system 404 further includes a storage abstraction module 412 that presents a storage configuration to a client device 402 and overlays the storage configuration on the object block stores 410. The storage abstraction module 412 allows for configurable and scalable use of the object block stores 410. The object block stores 410 may be configured by one or more of client devices 402 or by a configuration device 403. The storage abstraction module 412 is configured to facilitate storage of data objects 414.1-414.n received from the client devices 402. The data objects 414 may include unstructured data such as video, images, documents, files, etc. The storage abstraction module 412 may include a plurality of buckets 416.1-416.n, with each configured as a container for holding data objects 414 uploaded by a client device 402.

In operation, a client device 402 or a configuration device 403 may create one or more buckets 416.1-416.n, using a bucket creation module 430, to organize and control access to the data objects. To create a bucket 416, the client device 402 or another host, such as the configuration device 403, specifies a bucket name 418, and specifies a storage class bucket tag 420 identifying a store capability property, such as a storage class 411, for the bucket. The bucket name 418 is a unique identifier identifying, usually globally, only one bucket 416.

In operation, a client device 402 or a configuration device 403 have previously configured buckets 416 of varying capabilities, largely corresponding to types of capabilities compatible with prospective store capability object tags 422. The store management system 404 receives the data objects 414 using an object interface module 434. The received data objects 414 are then processed by the abstraction module 412 configured to map the received data object 414, using the store capability object tag 422, to determine a bucket 416 with a storage class 411 that can accommodate the store capability needs of the data object 414. An object block store interface module 438 then uploads the received data object 414 to an object block store 410 corresponding to a bucket having the store capabilities corresponding to the store capability object tag 422 accompanying the data object 414.

The store capability object tag 422 identifies, at the abstraction module 412, the requested capability in the physical object block stores 410 where the data object 414 will be stored. The abstraction module 412 then identifies a compatible bucket 416 that matches the store capability object tag 422. The abstraction module 412 maps the abstracted bucket 416 to respective object block stores 410 having various capabilities identified as various storage classes 411. As stated, the types of buckets created by the abstraction module 412 provide compatible buckets for the requested capability specified by the store capability object tag 422. The store capability object tag 422 may include a request for various values or capability properties of the corresponding object block store capabilities. For example, the store capability object tag 422 may be configured as a key-value pair with the key being the store capability and the value being one of, but not limited to, one of access speed, storage capacity, latency, and storage type of the corresponding object block store 410.

While data objects 414 are targeted to be stored in object block store 410, not all data objects 414 serve the same purpose. Some data objects 414 may need to be more readily available for quick or frequent access, while other data objects 414 may be targeted for archival storage in object block stores 410. Accordingly, each data object 414 may have associated therewith one or more attributes, which may identify a store capability demand for the object. The attributes of data object 414 may also include other properties such as an object identifier, size, source/destination identifiers, etc.

As stated, the storage system 400 includes a plurality of object block stores 410, and a store management system 404. The store management system 404 includes an abstraction module 412 configured to define, using a bucket creation module 430, a first bucket 416 including a first storage class bucket tag 420 identified by a first key-value pair corresponding to a first one of a plurality of object block store differing capabilities.

Figure 5:
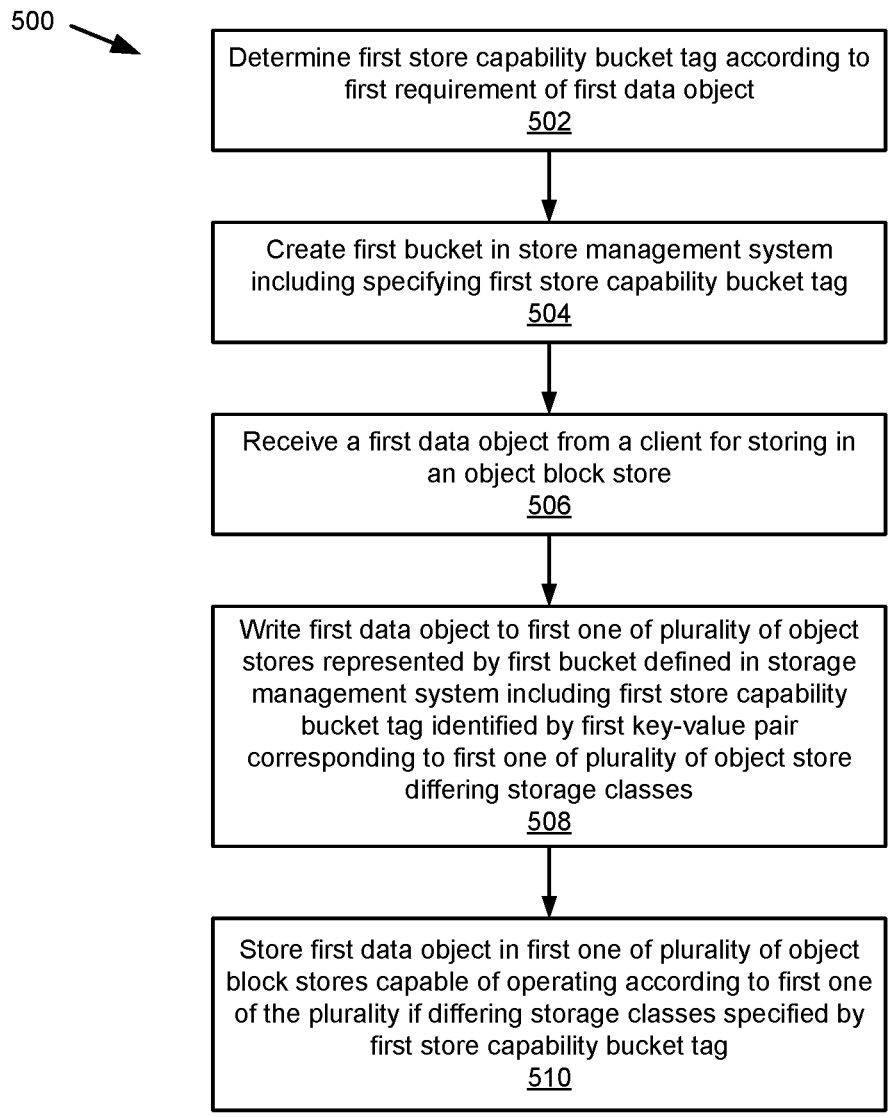
FIG. 5 illustrates an example method for storing object data in an object block store.

FIG. 5 illustrates an example method for storing object data in an object block store, in accordance with a first embodiment. The example method 500 accommodates the storage of object data in object block stores configured into a specified bucket formed in one or more specified object block stores.

At block 502, a store management system 304 determines a first storage class bucket tag according to the type of data or data requirement of a first data object. In the present embodiment, the buckets may be requested by a client or configuration device in anticipation of objects being uploaded with specific store requirements. The client or configuration device may request 301 the creation of a bucket by forwarding a key-value pair corresponding to a "storage capability" and a "storage class."

In block 504, the bucket creation module 330 and the abstraction module 312 create a first bucket 316.1 in the store management system 304 including specifying a first storage class bucket tag 320 which is a key-value pair of a specific storage class.

In block 506, the object interface module 334 receives a first data object from a client for storing in an object block store that includes a storage class consistent with the requested storage class.

In block 508, the store interface module 338 writes the first data object to a first one 310.1 of a plurality of object block stores 310 represented by the first bucket 316.1 defined in the store management system 304. The first bucket 316.1 includes capabilities defined as a storage class 311.1 defined by a first storage class bucket tag 320.1 identified by a first key-value pair corresponding to a first one of a plurality of object block stores with a first storage class as received during bucket creation.

In block 510, the store management system 304 stores the first data object in the first one 310.1 of the plurality of object block stores 310, according to the first storage class specified by the first storage class bucket tag.

In one non-limiting example, during bucket creation, a user provides additional fields such as storage capability and storage class as a key-value pair. The bucket is created and tagged with the user-provided storage capability. All objects written to the tagged bucket are stored on respective media types. Accordingly, the user can ensure all objects created in a bucket tagged with the specific storage capability are stored on media having the designated capability. For example, if high-speed access is important for the class of objects, then the bucket may be created to include solid-state drives. Contrary, if objects are designated as seldomly accessed, such as archive objects, then the bucket may be created to include hard-disk drives.

Figure 6:
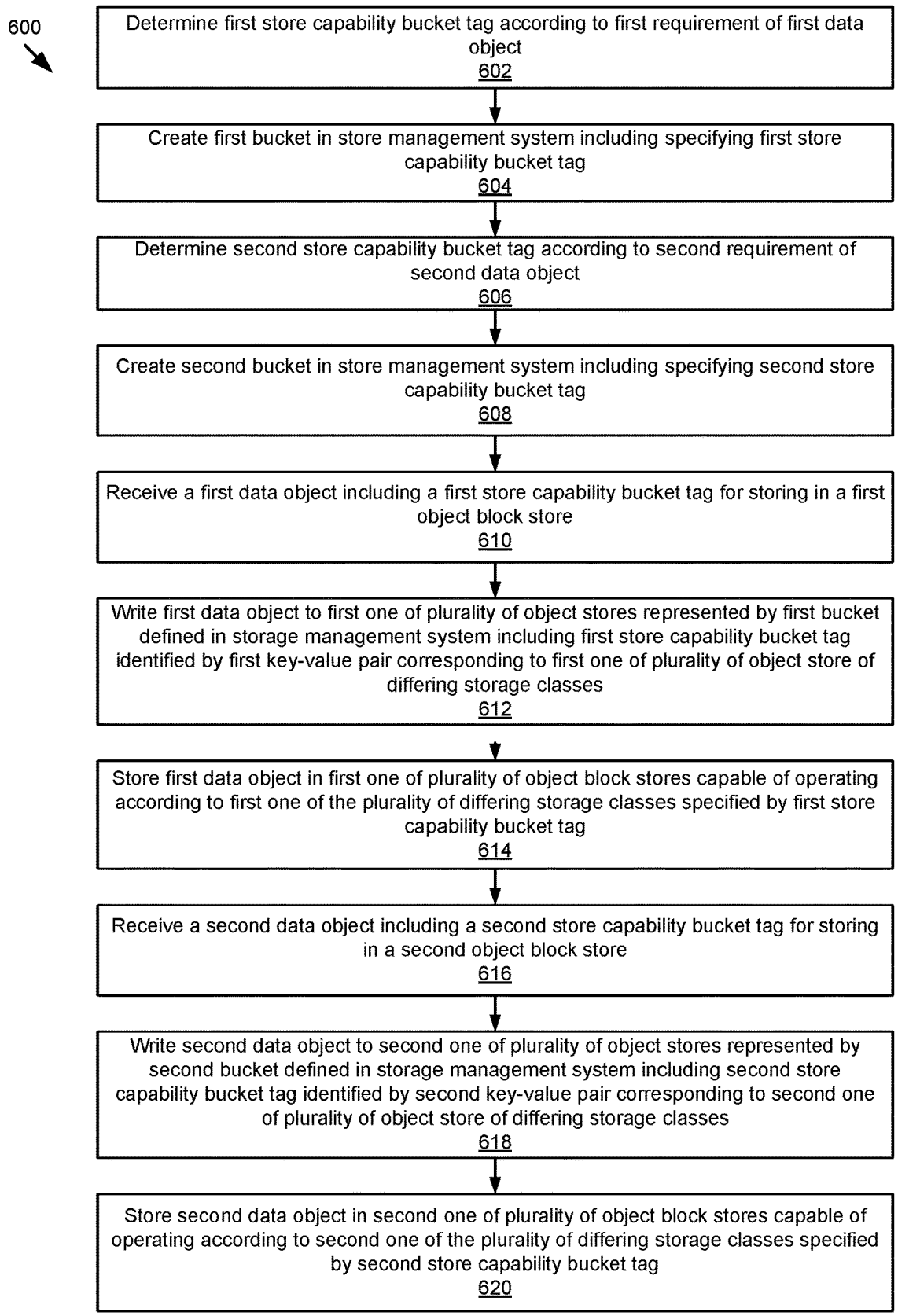
FIG. 6 illustrates an example method for storing object data in object block stores.

FIG. 6 illustrates an example method for storing object data in object block stores, in accordance with a second embodiment. The example method 600 accommodates the storage of object data in object block stores configured into respective first and second buckets formed in object block stores having respective first and second storage classes.

At block 602, a store management system 404 determines a first storage class bucket tag according to the type of data or data requirement of a first data object. In the present embodiment, the buckets may be requested by a client or configuration device in anticipation of objects being uploaded with specific store requirements. The client or configuration device may request 401 the creation of a bucket by forwarding a key-value pair corresponding to a "storage capability" and a "storage class."

In block 604, the bucket creation module 430 and the abstraction module 412 create a first bucket 416.1 in the store management system 404 including specifying a first storage class bucket tag 420 which is a key-value pair of a specific storage class.

At block 606, a store management system 404 determines a second storage class bucket tag 420.n according to the type of data or data requirement of a second data object. In the present embodiment, the buckets may be requested by a client or configuration device in anticipation of objects being uploaded with specific store requirements. The client or configuration device may request 401 the creation of a bucket by forwarding a key-value pair corresponding to a "storage capability" and a "storage class."

In block 608, the bucket creation module 430 and the abstraction module 412 create a second bucket 416.n in the store management system 404 including specifying a second storage class bucket tag 420 which is a key-value pair of a specific storage class.

In block 610, the object interface module 434 receives a first data object including a first store capability bucket tag from a client for storing in a first object block store that includes a storage class consistent with a requested first storage class.

In block 612, the store interface module 438 writes the first data object to a first one 410.1 of a plurality of object block stores 410 represented by the first bucket 416.1 defined in the store management system 404. The first bucket 416.1 includes capabilities defined as a storage class 411.1 defined by a first storage class bucket tag 420.1 identified by a first key-value pair corresponding to a first one of a plurality of object block stores with a first storage class as received during bucket creation.

In block 614, the store management system 404 stores the first data object in the first one 410.1 of the plurality of object block stores 410, according to the first storage class specified by the first storage class bucket tag.

In block 616, the object interface module 434 receives a second data object including a second store capability bucket tag from a client for storing in a second object block store that includes a storage class consistent with a requested second storage class.

In block 618, the store interface module 438 writes the second data object to a second one 410.*n* of a plurality of object block stores 410 represented by the second bucket 416.*n* defined in the store management system 404. The second bucket 416.*n* includes capabilities defined as a storage class 411.*n* defined by a second storage class bucket tag 420.*n* identified by a second key-value pair corresponding to a second one of a plurality of object block stores with a first storage class as received during bucket creation.

In block 620, the store management system 404 stores the second data object in the second one 410.*n* of the plurality of object block stores 410, according to the second storage class specified by the second storage class bucket tag.

In one non-limiting example, there are times when a user may want to store only selected objects in a bucket having a selected storage capability. To achieve such a result, object tagging may be utilized to tag the object with a specific storage capability. Accordingly, instead of bucket tagging the object, the object may be tagged with a key-value pair of storage capability and storage class. The storage class of the object and block store are compared and the objects are stored in a block store matching the selected storage capability.

The various examples presented herein allow a user to obtain cost reductions by utilizing various storage benefits, including a benefit of utilizing a hybrid storage rack for storing a mixed workload of objects. The various examples may also be incorporated into bucket-capable systems that support object data tagging.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

It should be understood that various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer-readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the Python, JavaScript, Java, and/or C programming languages, or another suitable programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general-purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A system, comprising:
a plurality of object block stores; and
a store management system configured to:
   access a first bucket, wherein:
      a first storage class bucket tag is associated with the first bucket;
      the first storage class bucket tag contains a first key-value pair corresponding to a first storage class; and
      the first bucket is configured to store data objects in at least one object block store of the plurality of object block stores with the first storage class;
   assign a first data object to the first bucket;
   determine, based on assigning the first data object to the first bucket, a first object block store from the at least one object block store of the plurality of object block stores with the first storage class; and
   write the first data object to the first object block store of the plurality of object block stores with the first storage class.

2. The system of claim 1, wherein the store management system is further configured to:
   receive, at the store management system, the first key-value pair specifying a requirement of the first data object;
   create the first bucket identified by the first storage class bucket tag; and
   configure the first bucket to store data objects in the at least one object block store of the plurality of object block stores with the first storage class according to the requirement of the first data object.

3. The system of claim 1, wherein the store management system is further configured to receive the first data object and a first store capability object tag specifying the first bucket and a first store capability.

4. The system of claim 3, wherein:
the store management system is further configured to:
   define a second bucket, wherein:
      a second storage class bucket tag is associated with the second bucket;
      the second storage class bucket tag includes a second key-value pair corresponding to a second storage class; and
      the second bucket is configured to store data objects in at least one object block store of the plurality of object block stores with the second storage class;
   assign a second data object to the second bucket;
   determine, based on assigning the second data object to the second bucket, a second object block store from the at least one object block store of the plurality of object block stores with the second storage class; and
   write the second data object to the second object block store.

5. The system of claim 4, wherein the second data object further includes a second store capability object tag identified by the second key-value pair corresponding to the second storage class.

6. The system of claim 1, wherein the plurality of object block stores with differing storage classes of the plurality of object block stores includes classes of one or more of:
   an access speed of the plurality of object block stores;
   a storage capacity of the plurality of object block stores;
   a latency of the plurality of object block stores; and
   a storage type of the plurality of object block stores.

7. The system of claim 1, wherein the plurality of object block stores with differing storage classes of the plurality of object block stores includes capabilities of a solid-state drive (SSD) and a hard disk drive (HDD).

8. A computer-implemented method, comprising:
defining a first bucket in a store management system, wherein:
   a first storage class bucket tag is associated with the first bucket;
   the first storage class bucket tag contains a first key-value pair corresponding to a first storage class; and
   the first bucket is configured to store data objects in at least one object block store of a plurality of object block stores with the first storage class;
assigning a first data object to the first bucket;
determining, based on assigning the first data object to the first bucket, a first object block store from the at least one object block store of the plurality of object block stores with the first storage class; and
writing the first data object to the first object block store.

9. The computer-implemented method of claim 8, further comprising:
   determining the first storage class bucket tag according to a first requirement of the first data object;
   creating the first bucket in the store management system;
   associating the first storage class bucket tag with the first bucket; and
   configuring the first bucket to store data objects in the at least one object block store of the plurality of object block stores with the first storage class according to the first requirement of the first data object.

10. The computer-implemented method of claim 8, wherein the first data object further includes a first store capability object tag identified by the first key-value pair.

11. The computer-implemented method of claim 10, further comprising:

defining a second bucket in a store management system, wherein:
  a second storage class bucket tag is associated with the second bucket;
  the second storage class bucket tag contains a second key-value pair corresponding to a second storage class; and
  the second bucket is configured to store data objects in at least one object block store of a plurality of object block stores with the second storage class;
assigning a second data object to the second bucket;
determining, based on assigning the second data object to the second bucket, a second object block store from the at least one object block store of the plurality of object block stores with the second storage class; and
writing the second data object to the second object block store.

12. The computer-implemented method of claim 11, wherein the second data object further includes a second store capability object tag identified by the second key-value pair.

13. The computer-implemented method of claim 8, wherein a plurality of differing storage classes of the plurality of object block stores includes classes of one or more of:
  an access speed of the plurality of object block stores;
  a storage capacity of the plurality of object block stores;
  a latency of the plurality of object block stores; and
  a storage type of the plurality of object block stores.

14. The computer-implemented method of claim 8, wherein a plurality of differing storage classes of the plurality of object block stores includes capabilities of a solid-state drive (SSD) and a hard disk drive (HDD).

15. A system, comprising:
  means for defining a first bucket in a store management system, wherein:
    a first storage class bucket tag is associated with the first bucket;
    the first storage class bucket tag contains a first key-value pair corresponding to a first storage class; and
    the first bucket is configured to store data objects in at least one object block store of a plurality of object block stores with the first storage class;
  means for assigning a first data object to the first bucket;
  means for determining, based on assigning the first data object to the first bucket, a first object block store from the at least one object block store of the plurality of object block stores with the first storage class; and
  means for writing the first data object to the first object block store.

16. The system of claim 15, further comprising:
  means for determining the first storage class bucket tag according to a first requirement of the first data object;
  means for creating the first bucket in the store management system;
  means for associating the first storage class bucket tag with the first bucket; and
  means for configuring the first bucket to store data objects in the at least one object block store of the plurality of object block stores with the first storage class according to the first requirement of the first data object.

17. The system of claim 15, wherein the first data object further includes a first store capability object tag identified by the first key-value pair.

18. The system of claim 17, further comprising:
  means for defining a second bucket in a store management system, wherein:
    a second storage class bucket tag is associated with the second bucket;
    the second storage class bucket tag contains a second key-value pair corresponding to a second storage class; and
    the second bucket is configured to store data objects in at least one object block store of a plurality of object block stores with the second storage class;
  means for assigning a second data object to the second bucket;
  means for determining, based on assigning the second data object to the second bucket, a second object block store from the at least one object block store of the plurality of object block stores with the second storage class; and
  means for writing the second data object to the second object block store.

19. The system of claim 18, wherein the second data object further includes a second store capability object tag identified by the second key-value pair.

20. The system of claim 15, wherein the plurality of object block stores with differing storage classes of the plurality of object block stores includes classes of one or more of:
  an access speed of the plurality of object block stores;
  a storage capacity of the plurality of object block stores;
  a latency of the plurality of object block stores; and
  a storage type of the plurality of object block stores.

* * * * *